United States Patent
Tononishi

(10) Patent No.: US 10,276,840 B2
(45) Date of Patent: Apr. 30, 2019

(54) ENERGY STORAGE APPARATUS AND METHOD OF MANUFACTURING THE SAME

(71) Applicant: GS Yuasa International Ltd., Kyoto-shi (JP)

(72) Inventor: Masamitsu Tononishi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 161 days.

(21) Appl. No.: 15/390,167

(22) Filed: Dec. 23, 2016

(65) Prior Publication Data

US 2017/0207428 A1    Jul. 20, 2017

(30) Foreign Application Priority Data

Jan. 18, 2016 (JP) ................. 2016-007448

(51) Int. Cl.
| | |
|---|---|
| *H01M 2/00* | (2006.01) |
| *H01M 2/06* | (2006.01) |
| *H01M 2/30* | (2006.01) |
| *H01G 11/74* | (2013.01) |
| *H01M 2/10* | (2006.01) |

(52) U.S. Cl.
CPC .............. *H01M 2/06* (2013.01); *H01G 11/74* (2013.01); *H01M 2/30* (2013.01); *H01M 2/1016* (2013.01)

(58) Field of Classification Search
CPC .......... H01G 11/74; H01M 2/30; H01M 2/06; H01M 2/1016
See application file for complete search history.

(56) References Cited

U.S. PATENT DOCUMENTS

| | | | |
|---|---|---|---|
| 2012/0264007 A1* | 10/2012 | Sasaki | H01M 2/043 429/182 |
| 2013/0264875 A1 | 10/2013 | Kaminsky et al. | |
| 2013/0266824 A1 | 10/2013 | Cowperthwaite et al. | |
| 2013/0266825 A1 | 10/2013 | Cowperthwaite et al. | |
| 2013/0266826 A1 | 10/2013 | Cowperthwaite et al. | |
| 2015/0017501 A1* | 1/2015 | Harayanna | H01M 2/26 429/99 |

FOREIGN PATENT DOCUMENTS

| | | |
|---|---|---|
| JP | H04-088661 U | 7/1992 |
| JP | H08-273656 A | 10/1996 |
| JP | H09-237615 A | 9/1997 |

(Continued)

*Primary Examiner* — Cynthia H Kelly
*Assistant Examiner* — Monique M Wills
(74) *Attorney, Agent, or Firm* — McGinn I.P. Law Group, PLLC.

(57) ABSTRACT

An energy storage apparatus includes an energy storage device, an outer covering. The energy storage apparatus further includes an external connection terminal having a connecting portion to which external equipment is connected; and a conductive member assembled to the external connection terminal, and electrically connected to the energy storage device. The external connection terminal and the conductive member assembled to each other are sealed by the outer covering, the connecting portion of the external connection terminal is exposed from the outer covering, and a portion of the external connection terminal other than the connecting portion is sealed by the outer covering.

19 Claims, 7 Drawing Sheets

(56) References Cited

FOREIGN PATENT DOCUMENTS

| | | |
|---|---|---|
| JP | H11-045696 A | 2/1999 |
| JP | 2000-195497 A | 7/2000 |
| JP | 2000-228183 A | 8/2000 |
| JP | 2003-346777 A | 12/2003 |
| JP | 2005-339969 A | 12/2005 |
| JP | 2011-023142 A | 2/2011 |
| JP | 2012-009319 A | 1/2012 |
| JP | 2012-138202 A | 7/2012 |
| JP | 2013-143395 A | 7/2013 |
| JP | 2014-075355 A | 4/2014 |
| JP | 2015-011849 A | 1/2015 |
| JP | 2015-518233 A | 6/2015 |

\* cited by examiner

ENERGY STORAGE APPARATUS AND METHOD OF MANUFACTURING THE SAME

CROSS-REFERENCE TO RELATED APPLICATIONS

This application is based on Japanese Patent Applications No. 2016-007448 filed on Jan. 18, 2016, the entire contents of which is hereby incorporated by reference.

FIELD

The present invention relates to an energy storage apparatus which includes an energy storage device and an outer covering.

BACKGROUND

Conventionally, there has been known an energy storage apparatus in which a plurality of energy storage devices are housed in an outer covering. External connection terminals to which external equipment is connected project from the outer covering, and the external connection terminals and the outer covering are integrally formed with each other (see JP 2015-11849 A, for example).

However, in the energy storage apparatus described in JP 2015-11849 A, a part of the external connection terminal is exposed in the inside of the outer covering and hence, there is a possibility that water from the outside intrudes into the inside of the energy storage apparatus along a boundary between the external connection terminal and the outer covering. Further, the external connection terminal is exposed and hence, there is also a possibility that short-circuiting inadvertently occurs due to the existence of the exposed part.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It is an object of the present invention to provide an energy storage apparatus which can enhance waterproofness and insulating property thereof and a method of manufacturing the energy storage apparatus.

An energy storage apparatus according to an aspect of the present invention includes an energy storage device, an outer covering, an external connection terminal having a connecting portion to which external equipment is connected, and a conductive member assembled to the external connection terminal, and electrically connected to the energy storage device. The external connection terminal and the conductive member assembled to each other are sealed by the outer covering, the connecting portion of the external connection terminal is exposed from the outer covering, and a portion of the external connection terminal other than the connecting portion is sealed by the outer covering.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
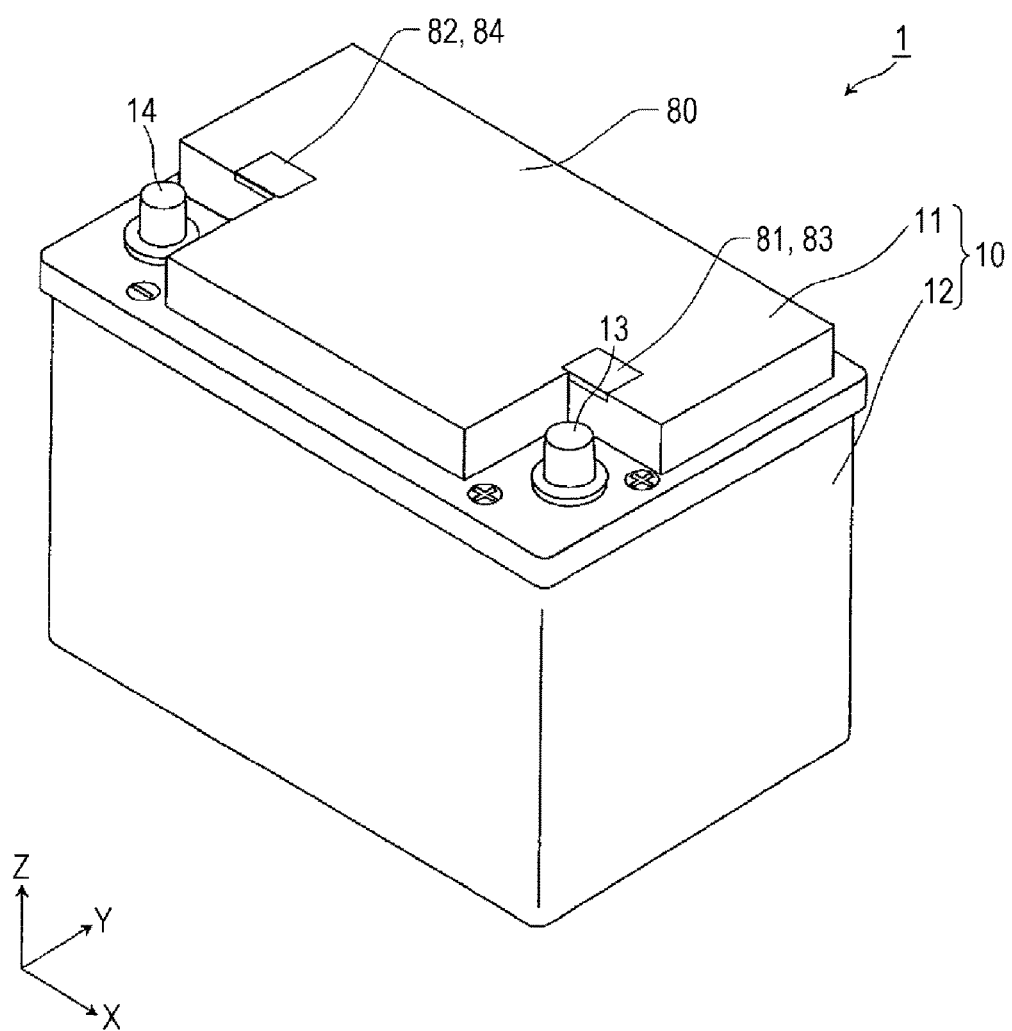
FIG. 1 is a perspective view showing an external appearance of an energy storage apparatus according to an embodiment of the present invention.

An energy storage apparatus according to an aspect of the present invention includes an energy storage device, an outer covering. The energy storage apparatus further includes an external connection terminal having a connecting portion to which external equipment is connected, and a conductive member assembled to the external connection terminal, and electrically connected to the energy storage device. The external connection terminal and the conductive member assembled to each other are sealed by the outer covering, the connecting portion of the external connection terminal is exposed from the outer covering, and a portion of the external connection terminal other than the connecting portion is sealed by the outer covering.

With such a configuration, the external connection terminal and the conductive member are sealed by the outer covering in a state where the external connection terminal and the conductive member are assembled to each other, the connecting portion of the external connection terminal is exposed from the outer covering, and the portion of the external connection terminal other than the connecting portion is sealed by the outer covering. Accordingly, water intrusion path where water intrudes into the energy storage apparatus along the external connection terminal and the conductive member can be closed and hence, insulating property can also be maintained with certainty.

A portion of the conductive member connected to the energy storage device may be exposed from the outer covering.

With such a configuration, the portion of the conductive member connected to the energy storage device is exposed from the outer covering and hence, an operation of connecting the energy storage device and the conductive member to each other can be performed easily.

The energy storage apparatus may further include a fixing member which fixes the external connection terminal and the conductive member to each other, and the fixing member may be sealed by the outer covering in a state where the fixing member fixes the external connection terminal and the conductive member to each other.

With such a configuration, the fixing member is sealed by the outer covering in a state where the fixing member fixes the external connection terminal and the conductive member to each other and hence, the external connection terminal and the conductive member can be firmly assembled to each other by the fixing member. Further, the fixing member is sealed and hence, loosening of the fixing member can be suppressed.

An intermediate path of the conductive member between a connection position where the conductive member is electrically connected to the energy storage device and an assembling position where the external connection terminal is assembled to the conductive member may have at least one of a bent shape, a curved shape, a folded shape and a combination thereof.

With such a configuration, the intermediate path of the conductive member between the connection position and the assembling position has at least one of a bent shape, a curved shape, a folded shape and a combination thereof. Therefore, the conductive member can acquire an elongated shape compared to a case where the conductive member extends in a linear shape between the connection position and the assembling position. Accordingly, a water intrusion path can be elongated and hence, even when water intrudes into the energy storage apparatus by any chance, it is possible to make it difficult for water to reach the inside of the outer covering.

Further, the conductive member has a shape longer than a shape which the conductive member extends in a linear shape between the connection position and the assembling position and hence, an area of the conductive member sealed by the outer covering can be increased. Accordingly, a torque resistance at the time of connecting the connecting portion and the external equipment to each other can be increased.

The conductive member may have a raised portion in which at least a part of the conductive member which falls within a range from the connection position to the assembling position may be set higher than the assembling position, and a portion of the raised portion of the conductive member may be sealed by the outer covering.

With such a configuration, at least a part of the conductive member which falls within a range from the connection position to the assembling position is disposed higher than the assembling position, and a portion of the raised portion is sealed by the outer covering. Therefore, even when water intrudes into the energy storage apparatus by any chance, it is possible to make it difficult for water to reach the connection position.

At least one of a concave portion or a convex portion may be formed on a peripheral edge portion of the conductive member.

With such a configuration, due to the formation of at least one of the concave portion or the convex portion on the peripheral edge portion of the conductive member, a water intrusion path can be further elongated.

A method of manufacturing an energy storage apparatus according to another aspect of the present invention is a method of manufacturing the above-mentioned energy storage apparatus where the outer covering is formed by insert molding using a resin material in a state where the external connection terminals and the conductive members are assembled to each other.

With such a configuration, the method of manufacturing the energy storage apparatus can acquire substantially the same advantageous effects as the above-mentioned energy storage apparatus.

According to the present invention, it is possible to enhance waterproofness and insulating property of an energy storage apparatus.

Hereinafter, the energy storage apparatus according to the embodiment of the present invention is described with reference to drawings. The embodiment described hereinafter is one preferred specific example of the present invention. In the embodiment described hereinafter, numerical values, shapes, materials, constitutional elements, the arrangement positions and connection states of the constitutional elements and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements. In the respective drawings, the respective constitutional elements are not described strictly accurately in size or the like.

First, a configuration of an energy storage apparatus 1 is described.

Figure 2:
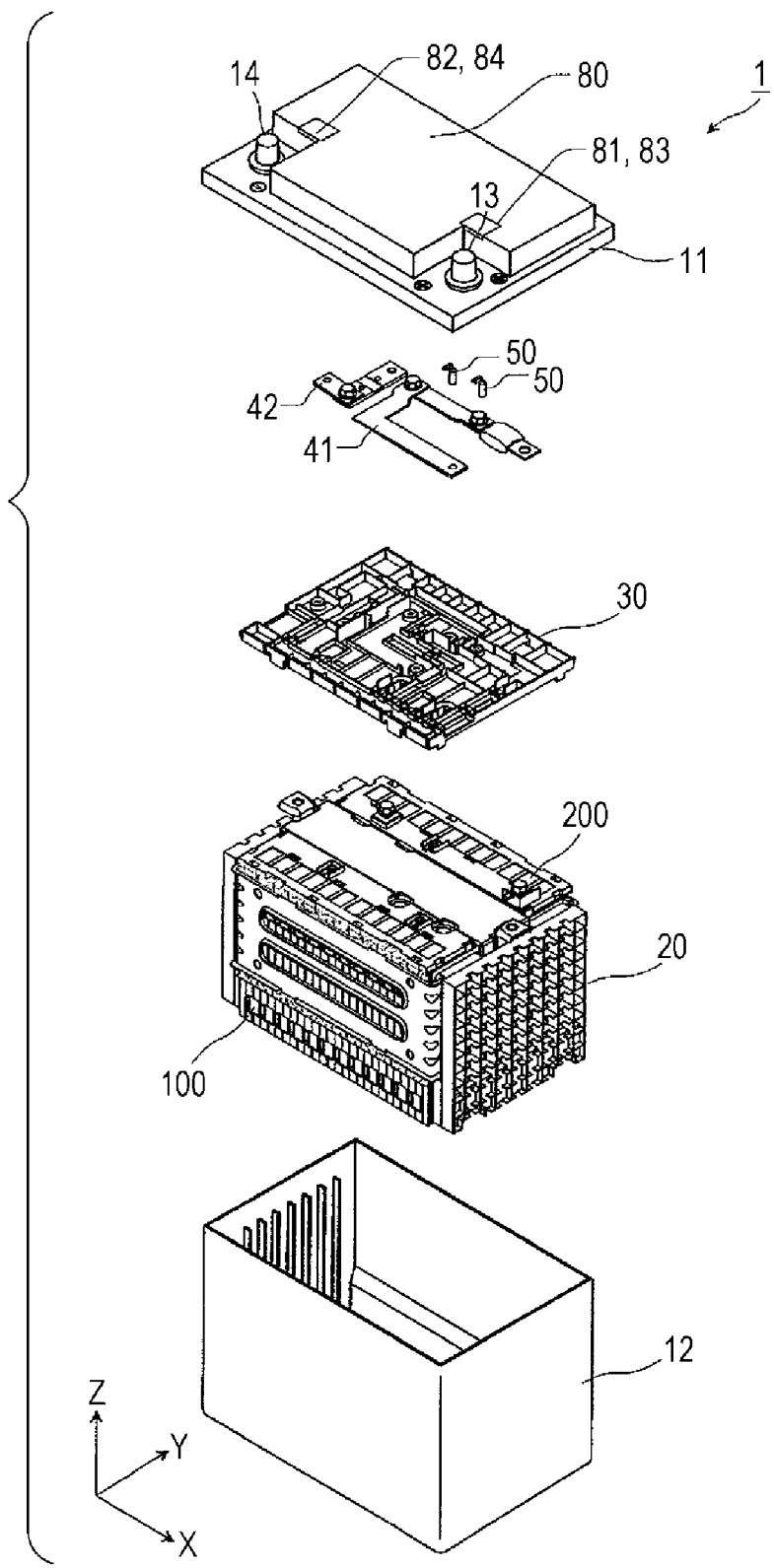
FIG. 2 is an exploded perspective view showing respective constitutional elements of the energy storage apparatus in a disassembled state.

FIG. 1 is a perspective view showing an external appearance of the energy storage apparatus 1 according to an embodiment of the present invention. FIG. 2 is an exploded perspective view showing respective constitutional elements of the energy storage apparatus 1 in a disassembled state.

In these drawings, the Z axis direction is indicated as the vertical direction, and the description is made hereinafter using the Z axis direction as the vertical direction. However, there may be also a case where the Z axis direction is not the vertical direction depending on a mode of use and hence, the Z axis direction is not limited to the vertical direction. The same goes for drawings which are referenced hereinafter.

The energy storage apparatus 1 is an apparatus which can charge electricity from the outside of the energy storage apparatus 1 therein or can discharge electricity to the outside of the energy storage apparatus 1. For example, the energy storage apparatus 1 is a battery module used for power storage application, power source application or the like. Particularly, in this embodiment, it is preferable that the energy storage apparatus 1 be used as an engine starting battery for a mobile body such as an automobile, a motorcycle, a water craft, a snowmobile, an agricultural machine or a construction machine, for example. In this case, to facilitate the maintenance, the exchange operation and the like, for example, the energy storage apparatus 1 is mounted in an exposed state at a place which an operator can easily access such as the inside of a hood, the inside of a trunk or the like of the mobile body. Further, the energy storage apparatus 1 can supply electricity to an external load singly (in a single form) or can be charged from an external power source singly (in a single form). That is, although there exists a configuration where a plurality of battery modules (energy storage apparatuses) are connected to each other and are housed in a case thus forming a battery pack as a driving power source for an electric vehicle, a plug-in hybrid electric vehicle and the like, the energy storage apparatus 1 of this embodiment has a configuration different from such a configuration. Further, a battery pack may be configured by electrically connecting the plurality of energy storage apparatuses 1 to each other corresponding to an external load or an external power source.

As shown in FIG. 1 and FIG. 2, the energy storage apparatus 1 includes an outer covering 10 formed of a first outer covering 11 and a second outer covering 12. The energy storage apparatus 1 also includes an energy storage unit 20, a holder 30, bus bars 41, 42, thermistors 50 and the like which are housed in the outer covering 10.

The outer covering 10 is a container (module case) having a rectangular shape (box shape) which forms an outer covering of the energy storage apparatus 1. The outer covering 10 is partially communicable with the outside of the energy storage apparatus 1, and is used in a substantially sealed state (semi-sealed state). That is, the outer covering 10 is disposed outside the energy storage unit 20, the holder 30, the bus bars 41, 42 and the thermistors 50, and allows the energy storage unit 20 and the like to be disposed at predetermined positions in the outer covering 10 thus protecting the energy storage unit 20 and the like from an impact or the like. For example, the outer covering 10 is made of an insulating resin material such as polycarbonate (PC), polypropylene (PP), polyethylene (PE), a polyphenylene sulfide resin (PPS), polybutylene terephthalate (PBT) or an ABS resin. Accordingly, the outer covering 10 prevents the energy storage unit 20 and the like from coming into contact with a metal member or the like disposed outside the outer covering 10.

In this embodiment, the outer covering 10 includes: the first outer covering 11 forming a lid body of the outer covering 10; and the second outer covering 12 forming a body of the outer covering 10. The first outer covering 11 is a cover member having a flat rectangular shape which closes an opening of the second outer covering 12. A positive electrode external terminal 13 and a negative electrode external terminal 14 are mounted on the first outer covering 11. The energy storage apparatus 1 charges electricity from the outside therein or discharges electricity to the outside through the positive electrode external terminal 13 and the negative electrode external terminal 14. The second outer covering 12 is a bottomed rectangular cylindrical housing having the opening, and houses the energy storage unit 20, the holder 30, the bus bars 41, 42, the thermistors 50 and the like.

The first outer covering 11 and the second outer covering 12 may be made of the same material, or may be made of different materials.

The specific configuration of the first outer covering 11 is described later.

The energy storage unit 20 includes a plurality of energy storage devices 100 (twelve energy storage devices 100 in this embodiment) and a plurality of bus bars 200, and is electrically connected to the positive electrode external terminal 13 and the negative electrode external terminal 14 formed on the first outer covering 11. That is, a positive electrode terminal of any one of the plurality of energy storage devices 100 is electrically connected to the positive electrode external terminal 13 through the bus bars 200. A negative electrode terminal of any one of the plurality of energy storage devices 100 is electrically connected to the negative electrode external terminal 14 through the bus bars 200.

The energy storage unit 20 is disposed in the inside of the second outer covering 12 such that the plurality of energy storage devices 100 are arranged in a row in the X axis direction in a state where each energy storage device 100 is mounted vertically. The energy storage unit 20 is housed in the outer covering 10 while being covered by the first outer covering 11 from above. The detailed configuration of the energy storage unit 20 is described later.

The holder 30 is a member which can hold the bus bars 41, 42, provides insulation between the bus bars 41, 42 and other members, and regulates the positions of the bus bars 41, 42. Particularly, the holder 30 performs the positioning of the bus bars 41, 42 with respect to the bus bars 200, the positive electrode external terminal 13 and the negative electrode external terminal 14 in the energy storage unit 20.

To be more specific, the holder 30 is mounted on an upper side (a plus side in the Z axis direction) of the energy storage unit 20 and is positioned with respect to the energy storage unit 20. The bus bars 41, 42 are mounted on the holder 30 and are positioned with respect to the holder 30. The first outer covering 11 is disposed on the holder 30. With such a configuration, the bus bars 41, 42 are positioned with respect to the bus bars 200 disposed in the inside of the energy storage unit 20 and the positive electrode external terminal 13 and the negative electrode external terminal 14 mounted on the first outer covering 11.

The holder 30 also has a function of holding the thermistors 50. That is, the thermistors 50 are mounted on the holder 30 so that the holder 30 performs the positioning of the thermistors 50 with respect to the energy storage devices 100. Further, the holder 30 fixes the thermistors 50 in a state where the thermistors 50 are pressed to the energy storage devices 100.

The holder 30 is made of an insulating resin material such as PC, PP, PE, PPS, PBT or an ABS resin, for example. However, the holder 30 may be made of any material provided that the holder 30 is made of a material having insulating property.

The bus bars 41, 42 electrically connect the bus bars 200 disposed in the energy storage unit 20 and the positive electrode external terminal 13 and the negative electrode external terminal 14 mounted on the first outer covering 11 to each other. That is, the bus bar 41 is a conductive member which electrically connects the bus bar 200 disposed on one end in the energy storage unit 20 and the positive electrode external terminal 13 to each other. The bus bar 42 is a conductive member which electrically connects the bus bar 200 disposed on the other end in the energy storage unit 20 and the negative electrode external terminal 14 to each other.

The bus bars 41, 42 are conductive members and are made of copper, for example. However, materials for forming the bus bars 41, 42 are not particularly limited. The bus bars 41, 42 may be made of the same material or different materials.

The thermistors 50 are temperature sensors mounted on the energy storage devices 100. That is, the thermistors 50 are mounted on the energy storage devices 100 and measure temperatures of the energy storage devices 100. In this embodiment, two thermistors 50 are mounted on two energy storage devices 100.

Next, the configuration of the energy storage unit 20 is described in detail.

Figure 3:
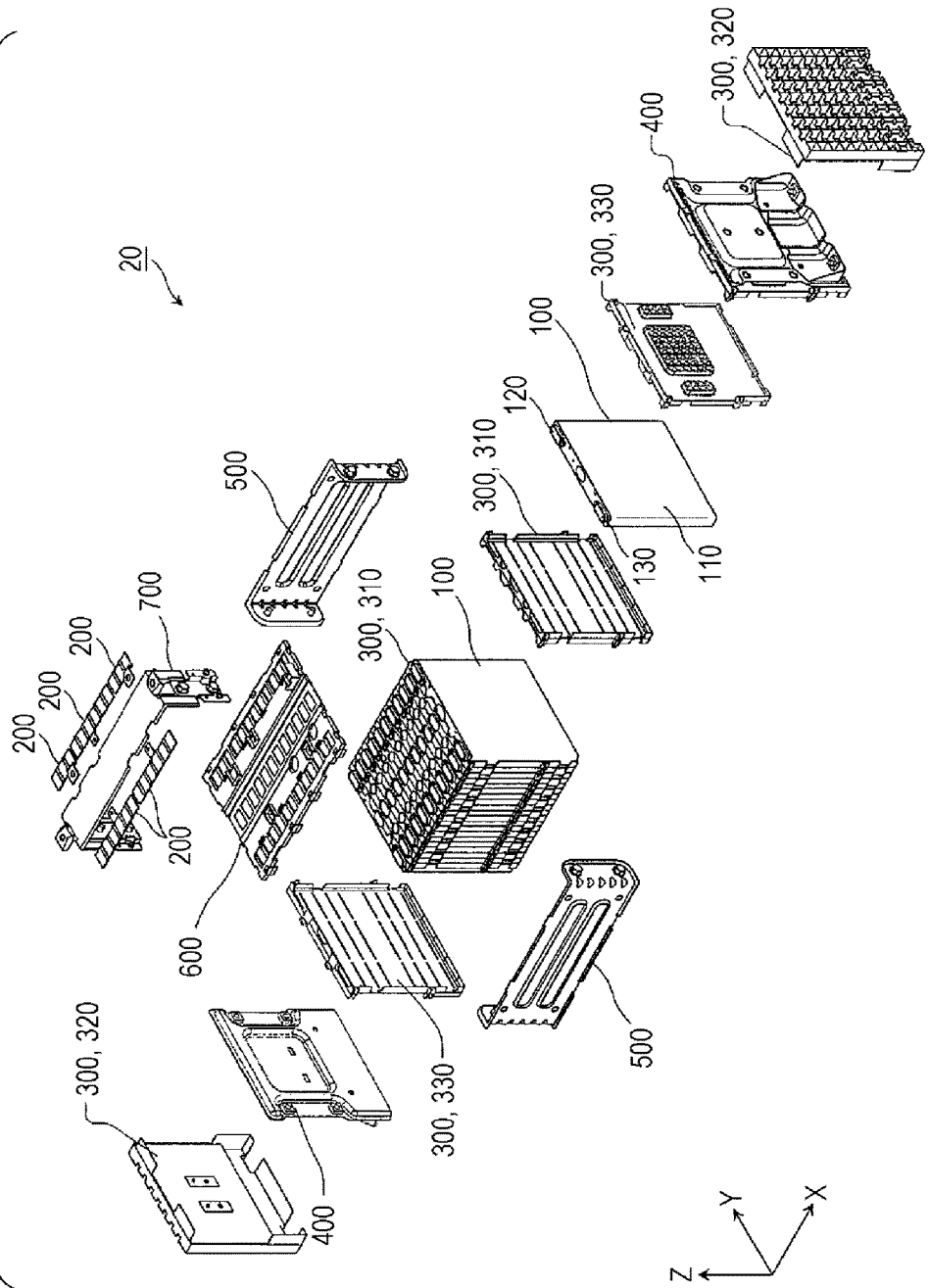
FIG. 3 is an exploded perspective view showing respective constitutional elements of an energy storage unit in a disassembled state.

FIG. 3 is an exploded perspective view showing respective constitutional elements of the energy storage unit 20 in a disassembled state.

As shown in the drawing, the energy storage unit 20 includes: the plurality of energy storage devices 100; the plurality of bus bars 200; a plurality of spacers 300 (a plurality of first spacers 310, a pair of second spacers 320 and a pair of third spacers 330); a pair of sandwiching members 400; a plurality of binding members 500; a bus bar frame 600; and a heat shielding plate 700.

The energy storage device 100 is a secondary battery (battery) which can charge or discharge electricity. To be more specific, the energy storage device 100 is a nonaqueous electrolyte secondary battery such as a lithium ion secondary battery. The energy storage device 100 has a flat rectangular shape, and is disposed adjacently to the first spacer 310. That is, the plurality of energy storage devices 100 and the plurality of first spacers 310 are arranged in a row in the X axis direction such that the energy storage device 100 and the first spacer 310 are alternately arranged. In this embodiment, twelve energy storage devices 100 and eleven first spacers 310 are arranged such that the energy storage device 100 and the first spacer 310 are arranged alternately and adjacently to each other. The energy storage device 100 is not limited to a nonaqueous electrolyte secondary battery, and may be a secondary battery other than a nonaqueous electrolyte secondary battery, or may be a capacitor.

As shown in the drawing, the energy storage device 100 includes a container 110, the positive electrode terminal 120 and the negative electrode terminal 130. An electrode assembly (power generating element), current collectors (a positive electrode current collector and a negative electrode current collector) and the like are disposed in the inside of the container 110, and a liquid such as an electrolyte solution (nonaqueous electrolyte) is sealed in the container 110. However, the detailed description of such a configuration is omitted.

The container 110 is formed of: a bottomed housing body made of metal and having a rectangular cylindrical shape; and a metal-made lid portion which closes an opening of the housing body. The container 110 is configured such that the inside of the container 110 can be hermetically sealed by joining the lid portion and the housing body to each other by welding or the like after the electrode assembly and the like are housed in the inside of the container 110. As described above, the container 110 is a rectangular parallelepiped container having a lid portion disposed on a plus side in the Z axis direction in the drawing, long side surfaces disposed on side surfaces of the container on both sides in the X axis direction, short side surfaces disposed on side surfaces of the container on both sides in the Y axis direction, and a bottom surface disposed on a minus side in the Z axis direction. Although a material for forming the container 110 is not particularly limited, it is preferable that the container 110 be made of weldable metal such as stainless steel, aluminum or an aluminum alloy, for example.

The positive electrode terminal 120 is an electrode terminal electrically connected to a positive electrode of an electrode assembly through a positive electrode current collector. The negative electrode terminal 130 is an electrode terminal electrically connected to a negative electrode of an electrode assembly through a negative electrode current collector. Both the positive electrode terminal 120 and the negative electrode terminal 130 are mounted on the lid portion of the container 110. That is, the positive electrode terminal 120 and the negative electrode terminal 130 are metal-made electrode terminals through which electricity stored in the electrode assembly is discharged to the outside the energy storage device 100, and through which electricity is introduced to the inside the energy storage device 100 for storing electricity in the electrode assembly. In this embodiment, the energy storage devices 100 are disposed in a state where the positive electrode terminals 120 and the negative electrode terminals 130 are directed upward.

The bus bars 200 are electrically connected to the plurality of respective energy storage devices 100 housed in the energy storage unit 20. That is, the bus bars 200 are conductive members electrically connected to the respective electrode terminals which the plurality of energy storage devices 100 include. The bus bars 200 electrically connect positive electrode terminals which the plurality of energy storage devices 100 have respectively to each other, and electrically connect negative electrode terminals which the plurality of energy storage devices 100 have respectively to each other. To be more specific, the bus bars 200 are disposed on surfaces of the respective electrode terminals which the plurality of respective energy storage devices 100 include, and are connected (joined) to the electrode terminals.

In this embodiment, five bus bars 200 are disposed on the energy storage devices 100. Twelve energy storage devices 100 are disposed such that four sets of energy storage devices 100 each of which is formed of three energy storage devices 100 connected parallel to each other are connected in series by five bus bars 200. The bus bars 200 disposed on end portions are connected to the bus bars 41, 42 described above so that the bus bars 200 are electrically connected to the positive electrode external terminal 13 and the negative electrode external terminal 14.

The bus bars 200 are conductive members made of aluminum, for example. However, a material for forming the bus bars 200 is not particularly limited. All bus bars 200 may be made of the same material, or some bus bars 200 may be made of different materials.

The spacers 300 are formed of the plurality of first spacers 310, the pair of second spacers 320 and the pair of third spacers 330. The spacers 300 are made of an insulating resin such as PC, PP, PE, PPS, PBT or an ABS resin, for example. The first spacers 310, the second spacers 320 and the third spacers 330 may be made of any material provided that the first spacers 310, the second spacers 320 and the third spacers 330 are made of a material having insulating property. All of the first spacers 310, the second spacers 320 and the third spacers 330 may be made of the same material, or any one of the first spacers 310, the second spacers 320 and the third spacers 330 may be made of a material different from a material for forming other spacers.

The first spacer 310 is a plate-like member which is disposed on a side (the plus side or the minus side in the X axis direction) of the energy storage device 100, and provides insulation between the energy storage device 100 and other members. That is, the first spacer 310 is arranged between two energy storage devices 100 disposed adjacently to each other, and provides insulation between two energy storage devices 100. In this embodiment, twelve energy storage devices 100 and eleven first spacers 310 are arranged in a row such that the first spacer 310 is disposed between two energy storage devices 100 disposed adjacently to each other.

The first spacer 310 is formed such that the first spacer 310 covers approximately half of a front surface side or a back surface side of the energy storage device 100 (an approximately half of the front surface side or the back surface side of the energy storage device 100 when the energy storage device 100 is divided in two in the X axis direction). That is, a recessed portion is formed on both surfaces (both surfaces in the X axis direction) of the first spacer 310 on the front surface side and the back surface side respectively, and an approximately half of the energy storage device 100 is inserted into each recessed portion. With such a configuration, the first spacers 310 disposed on sides of the energy storage device 100 cover the most part of the energy storage device 100. Accordingly, insulating property between the energy storage devices 100 and other conductive members can be enhanced by the first spacers 310.

The second spacer 320 is a plate-like member which is disposed between the sandwiching member 400 described later and the outer covering 10, and provides insulation between the sandwiching member 400 and the outer covering 10. The second spacer 320 also has a function as a buffer member which protects the energy storage unit 20 when an impact is applied to the outer covering 10 from the outside or the like. That is, the pair of second spacers 320 is disposed between the pair of sandwiching members 400 and the outer covering 10 such that the pair of second spacers 320 sandwiches the pair of sandwiching members 400 from both sides. The pair of second spacers 320 insulates the energy storage devices 100 and the like disposed in the energy storage unit 20, and also protects the energy storage devices 100 and the like from an impact from the outside.

The third spacer 330 is a plate-like member which is disposed on the outermost side in the X axis direction of the unit formed of the plurality of energy storage devices 100, and provides insulation between the unit formed of the plurality of energy storage devices 100 and other members. To be more specific, outer side surfaces of the pair of energy storage devices 100 disposed on the outermost side out of the plurality of energy storage devices 100 are not covered by the first spacers 310 and hence, the pair of third spacers 330 are provided for covering the outer side surfaces of the energy storage devices 100. With such a configuration, each of the pair of third spacers 330 is disposed between the unit formed of the plurality of energy storage devices 100 and the sandwiching member 400 thus providing insulation between the unit formed of the plurality of energy storage devices 100 and the sandwiching member 400.

The sandwiching members 400 and the binding members 500 are members which press the energy storage devices 100 from the outside in the stacking direction of the electrode assembly of the energy storage device 100. That is, the sandwiching members 400 and the binding members 500 sandwich the plurality of energy storage devices 100 from both sides in the stacking direction thus pressing each energy storage device included in the plurality of respective energy storage devices 100 from both sides. The stacking direction of the electrode assembly of the energy storage devices 100 means the direction in which positive electrodes, negative electrodes and separators of the electrode assembly are stacked, and is equal to the direction (X axis direction) in which the plurality of energy storage devices 100 are arranged in a row. That is, the plurality of energy storage devices 100 are arranged in a row in the stacking direction.

To be more specific, the sandwiching members 400 are flat plate-like members (end plates) disposed on both sides of the unit formed of the plurality of energy storage devices 100 in the X axis direction respectively. The sandwiching members 400 hold the plurality of energy storage devices 100, the plurality of first spacers 310 and the third spacers 330 by sandwiching the plurality of energy storage devices 100, the plurality of first spacers 310 and the third spacers 330 from both sides in the arrangement direction (X axis direction) of the plurality of energy storage devices 100, the plurality of first spacers 310 and the third spacers 330. The sandwiching member 400 is formed of a metal (conductive) material such as steel or stainless steel, for example, from a viewpoint of strength or the like of the sandwiching members 400. However, a material for forming the sandwiching member 400 is not limited to a metal material, and may be made of an insulating material having high strength, for example.

The binding members 500 are elongated flat-plate-like members (binding bars) each of which has both ends thereof mounted on the sandwiching members 400, and bind the plurality of energy storage devices 100 to each other. That is, the binding members 500 are disposed so as to straddle over the plurality of energy storage devices 100, the plurality of first spacers 310 and the pair of third spacers 330 thus applying a binding force in the arrangement direction (X axis direction) of these members to the plurality of energy storage devices 100, the plurality of first spacers 310 and the third spacers 330.

In this embodiment, two binding members 500 are disposed on both sides (both sides in the Y axis direction) of the unit formed of the plurality of energy storage devices 100, and two binding members 500 bind the plurality of energy storage devices 100 to each other by sandwiching the plurality of energy storage devices 100 from both sides. In the same manner as the sandwiching members 400, the binding members 500 are preferably made of a metal material such as steel or stainless steel, for example. However, the binding members 500 may be made of a material other than metal.

The bus bar frame 600 is a member which can provide insulation between the bus bars 200 and other members, and can regulate the positions of the bus bars 200. Particularly, the bus bar frame 600 performs the positioning of the bus bars 200 with respect to the plurality of energy storage devices 100 disposed in the energy storage unit 20.

To be more specific, the bus bar frame 600 is placed on an upper side (a plus side in the Z axis direction) of the unit formed of the plurality of energy storage devices 100, and is positioned with respect to the plurality of energy storage devices 100. The bus bars 200 are placed on the bus bar frame 600 and are positioned. With such a configuration, the bus bars 200 are positioned with respect to the plurality of energy storage devices 100, and the bus bars 200 are joined to electrode terminals which the plurality of respective energy storage devices 100 include. The bus bar frame 600 is made of an insulating resin material such as PC, PP, PE, PPS, PBT or an ABS resin, for example. However, the bus bar frame 600 may be made of any material provided that the bus bar frame 600 is made of a material having insulating property.

The heat shielding plate 700 is a plate-like member having heat insulating property which is disposed in a gas discharge flow passage formed in safety valves of the energy storage devices 100. To be more specific, the heat shielding plate 700 is disposed above the bus bar frame 600 such that the heat shielding plate 700 is positioned above the safety valves of the energy storage devices 100. That is, when an abnormal state occurs such as a case where a gas is discharged from the safety valve of the energy storage device 100, the heat shielding plate 700 protects electric equipment such as a printed circuit board disposed above the energy storage unit 20 from heat of the gas. In this embodiment, the heat shielding plate 700 is made of a metal material having low thermal conductivity such as stainless steel. However, a material for forming the heat shielding plate 700 is not limited to such a metal material, and any material having high heat resistance and low thermal conductivity can be used. For example, the heat shielding plate 700 may be made of a resin such as PPS or PBT reinforced with glass fibers, ceramic or the like.

The configuration of the first outer covering 11 of the energy storage apparatus 1 having the above-mentioned configuration is described in detail.

As shown in FIG. 1 and FIG. 2, the first outer covering 11 is a lid body which closes an opening of the second outer covering 12. A hollow projecting housing portion 80 having an approximately T shape as viewed in a top plan view and projecting upward is formed on the first outer covering 11. In an inner space of the projecting housing portion 80, electric equipment such as a printed circuit board (not shown in the drawing) and a relay (not shown in the drawing) and wiring (not shown in the drawing) for connecting such electric equipment and the energy storage devices 100 disposed in the energy storage unit 20 to each other are housed.

A control circuit is mounted on the printed circuit board, for example. The control circuit is provided for acquiring, monitoring and controlling various information such as a charge state, a discharge state, a voltage value, a current value, a temperature and the like of the energy storage device 100, performing an ON/OFF control of a relay, and performing the communication between the energy storage apparatus 1 and other equipment.

A first opening 81 for exposing a connecting portion between the positive electrode external terminal 13 and the bus bar 41 and a second opening 82 for exposing a connecting portion between the negative electrode external terminal 14 and the bus bar 42 are formed on an upper surface of the projecting housing portion 80. In a normal state, the first opening 81 and the second opening 82 are closed by closing members 83, 84 mounted on the projecting housing portion 80. In assembling the energy storage apparatus 1 or in performing maintenance of the energy storage apparatus 1, the closing members 83, 84 are removed from the projecting housing portion 80 so that the first opening 81 and the second opening 82 are exposed.

The positive electrode external terminal 13 and the negative electrode external terminal 14 are integrally formed with first outer covering 11. To be more specific, the positive electrode external terminal 13 and the negative electrode external terminal 14 are formed by insert molding using a resin material for forming the first outer covering 11 so that the first outer covering 11, the positive electrode external terminal 13 and the negative electrode external terminal 14 are molded as an integral body.

Figure 4:
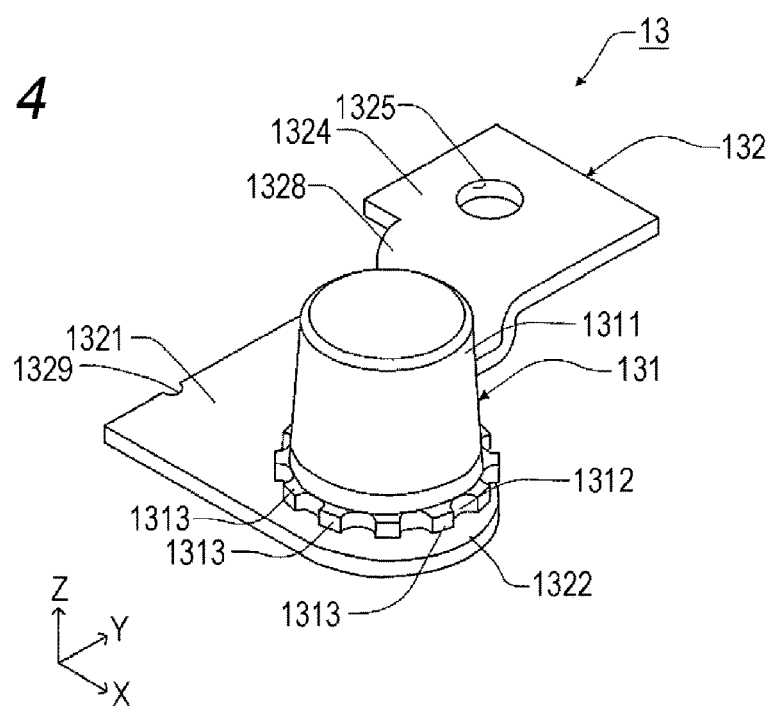
FIG. 4 is a perspective view showing a schematic configuration of a positive electrode external terminal.
Figure 5:
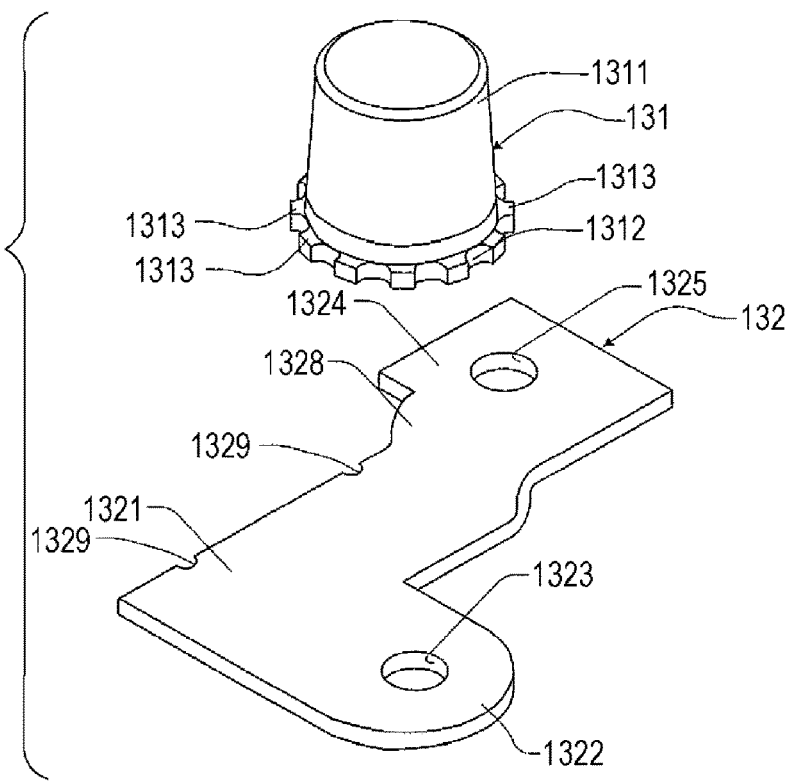
FIG. 5 is an exploded perspective view of the positive electrode external terminal.

FIG. 4 is a perspective view showing the schematic configuration of the positive electrode external terminal 13. FIG. 5 is an exploded perspective view of the positive electrode external terminal 13.

The negative electrode external terminal 14 has substantially the same configuration as the positive electrode external terminal 13 and hence, the description of the negative electrode external terminal 14 is omitted.

As shown in FIG. 4 and FIG. 5, the positive electrode external terminal 13 includes: an external connection terminal 131; a conductive member 132; and a fixing member 133.

The external connection terminal 131 includes: a connecting portion 1311 to which external equipment is electrically connected; and a rotation restricting portion 1312 which restricts the rotation of the external connection terminal 131 per se as integral portions thereof.

The connecting portion 1311 is formed into an approximately frustoconical shape, and is exposed from the first outer covering 11.

The rotation restricting portion 1312 is a two stage disk-shaped portion which is continuously formed from a proximal end portion of the connecting portion 1311. A plurality of protruding portions 1313 disposed along the circumferential direction are formed on an upper stage portion of the rotation restricting portion 1312. The plurality of protruding portions 1313 are embedded in the first outer covering 11 so that the protruding portions 1313 are locked to the first outer covering 11 thus restricting the rotation of the external connection terminal 131 per se. A threaded hole 1314 with which the fixing member 133 is threadedly engaged (see FIG. 8) is formed in a bottom surface of a lower stage portion of the rotation restricting portion 1312.

The threaded hole 1314 is formed such that a center axis of the threaded hole 1314 is aligned with a center axis C1 of the connecting portion 1311.

The conductive member 132 is a plate body having an approximately L shape as viewed in a top plan view. The conductive member 132 is assembled to the external connection terminal 131 so that the conductive member 132 is electrically connected to the energy storage device 100. To be more specific, the conductive member 132 includes: an elongated body portion 1321, and a projecting portion 1322 which projects from a proximal end portion of the body portion 1321 in the direction orthogonal to the longitudinal direction of the body portion 1321.

A through hole 1323 is formed in a distal end portion of the projecting portion 1322. By inserting the fixing member 133 into the through hole 1323 and by fastening the fixing member 133 to the external connection terminal 131, the conductive member 132 is assembled to the external connection terminal 131. That is, the through hole 1323 is an assembling position on the conductive member 132 where the conductive member 132 is assembled to the external connection terminal 131.

Figure 6:
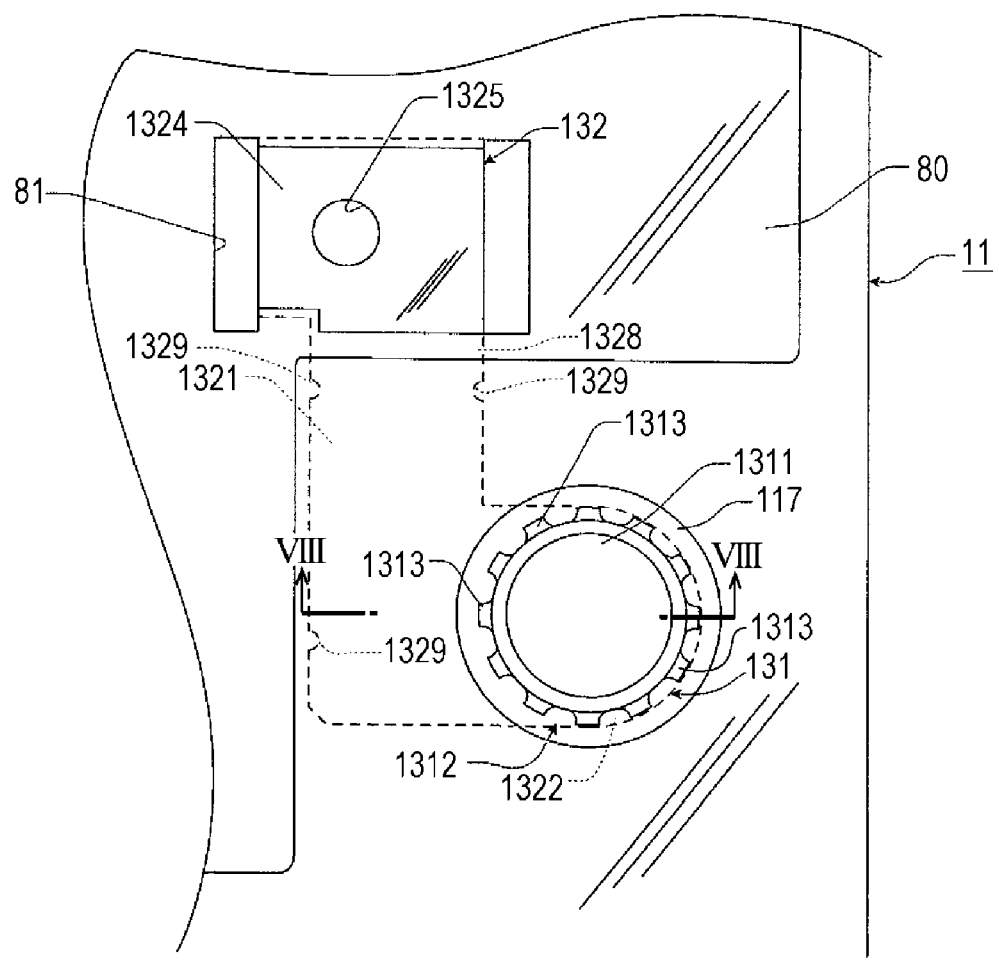
FIG. 6 is a top plan view showing a structure of a first outer covering in the vicinity of the positive electrode external terminal.

A plurality of concave portions 1329 each of which is formed into a semi-circular shape by notching are formed on both side portions of the body portion 1321 (see FIG. 6).

A distal end portion of the body portion 1321 is formed of a widened portion 1324 having a larger width than other portions. A raised portion 1328 having a stepped shape is formed between the widened portion 1324 and other portions of the body portion 1321 such that the widened portion 1324 is higher than other portions by one stage. A through hole 1325 is formed in the widened portion 1324. By inserting a fixing member not shown in the drawing into the through hole 1325 and fastening the fixing member to the bus bar 41, the widened portion 1324 is assembled to the bus bar 41. With such a configuration, the conductive member 132 is electrically connected to the energy storage device 100 through the bus bar 41. That is, the widened portion 1324 is a portion where the conductive member is electrically connected to the energy storage device 100. The through hole 1325 defines a connection position where a portion of the conductive member 132 is connected to the energy storage device 100. Since the widened portion 1324 and the projecting portion 1322 project from the body portion 1321, an intermediate path between the connection position and the assembling position has two bent shapes. It is sufficient that the intermediate path have at least one of a bent shape, a curved shape, a folded shape and a combination thereof. With such a configuration, the conductive member 132 can acquire an elongated shape compared to a case where the conductive member 132 extends in a linear shape between the connection position and the assembling position. Further, due to the formation of the raised portion 1328, the widened portion 1324 is disposed higher than the assembling position.

After the bus bar 41 is assembled, the bus bar 41 is disposed below the widened portion 1324 and hence, the bus bar 41 can be accommodated in a stepped portion of the conductive member 132.

The fixing member 133 is a bolt for fixing the external connection terminal 131 and the conductive member 132 which are assembled to each other, and the fixing member 133 includes a fixing shaft 1331 (bolt shaft) and a bolt head 1332. By inserting the fixing shaft 1331 (bolt shaft) of the fixing member 133 into the through hole 1323 formed in the conductive member 132 and by making the fixing shaft 1331 threadedly engage with the threaded hole 1314 formed in the external connection terminal 131, the external connection terminal 131 and the conductive member 132 are fixed to each other. In fixing the external connection terminal 131 and the conductive member 132 to each other, the bolt head 1332 of the fixing member 133 and the external connection terminal 131 sandwich the conductive member 132 therebetween. At this stage of operation, the bolt head 1332 of the fixing member 133 projects from the conductive member 132, and the fixing shaft 1331 of the fixing member 133 is aligned with the center axis C1 of the external connection terminal 131.

In this embodiment, the case is exemplified where the fixing member 133 is the bolt. However, the fixing member may be a member which fastens the external connection terminal 131 and the conductive member 132 to each other by caulking. Further alternatively, the external connection terminal 131 and the conductive member 132 may be formed integrally with each other by welding, bonding or brazing without using a fixing member.

The external connection terminal 131 and the conductive member 132 are formed by integral molding using a proper conductive material respectively. To be more specific, for example, brass, aluminum, aluminum alloy or the like can be named as a proper conductive material used for forming the external connection terminal 131. For example, copper, copper alloy or the like can be named as a proper conductive material used for forming the conductive member 132. It is preferable that the fixing member 133 be formed by integral molding using metal since the external connection terminal 131 and the conductive member 132 can be fasten to each other with certainty with the use of the metal-made fixing member 133. The positive electrode external terminal 13 is formed by insert molding using a resin material for forming the first outer covering 11 in a state where the external connection terminal 131, the conductive member 132 and the fixing member 133 are assembled to each other.

Next, the positive electrode external terminal 13 after insert molding is described.

Figure 7:
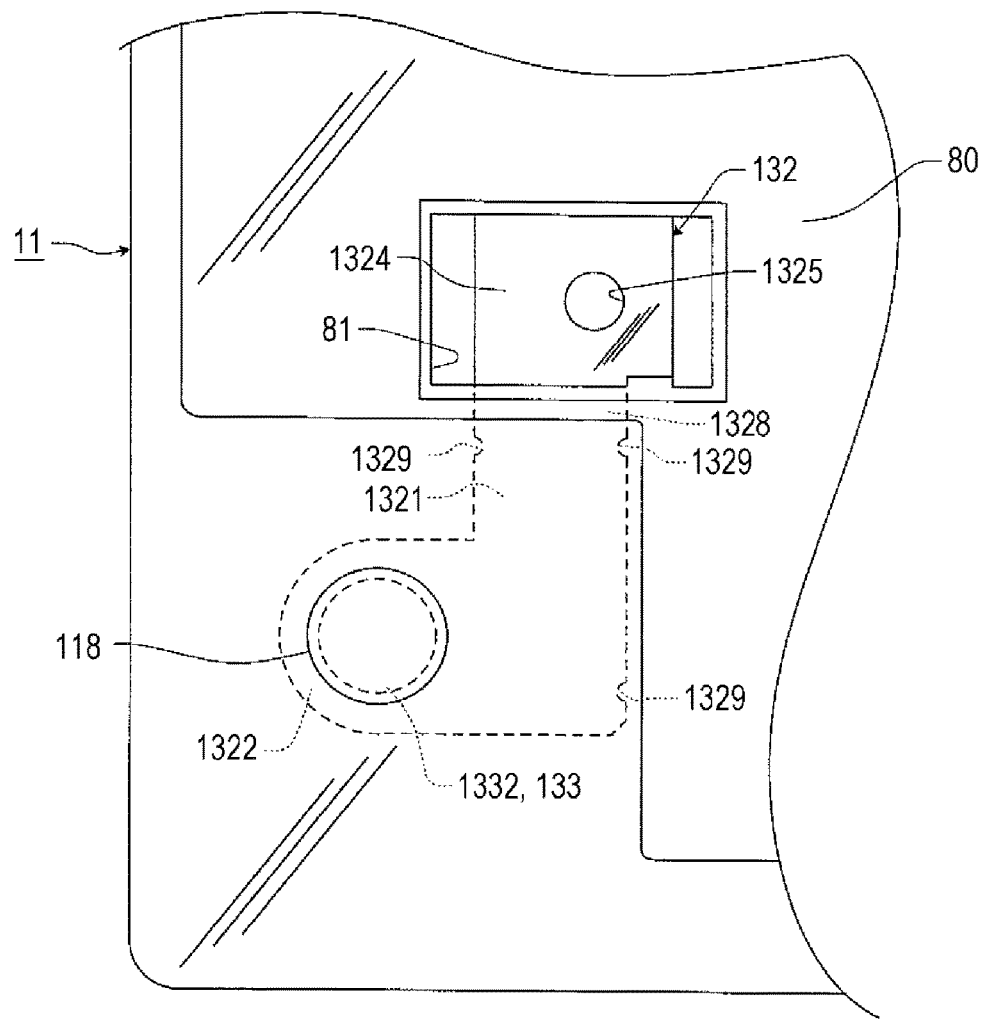
FIG. 7 is a bottom plan view showing a structure of the first outer covering in the vicinity of the positive electrode external terminal.
Figure 8:
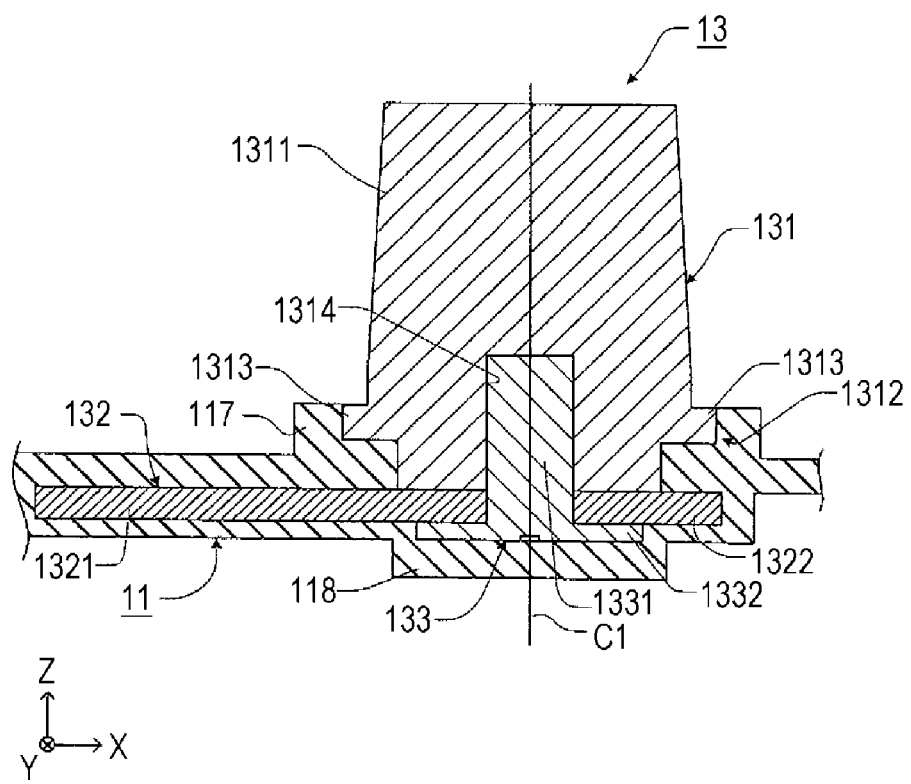
FIG. 8 is a cross-sectional view taken along a ZX plane including a line VIII-VIII in FIG. 6.

FIG. 6 is a top plan view showing the structure of the first outer covering 11 around the positive electrode external terminal 13. FIG. 7 is a bottom plan view showing the structure of the first outer covering 11 around the positive electrode external terminal 13. FIG. 8 is a cross-sectional view taken along a ZX plane including a line VIII-VIII in FIG. 6.

As shown in FIG. 6 to FIG. 8, the external connection terminal 131 of the positive electrode external terminal 13 is configured such that the connecting portion 1311 is exposed from the first outer covering 11, and portions of the external connection terminal 131 other than the connecting portion 1311 (rotation restricting portion 1312) are sealed by being embedded in the first outer covering 11. Even with respect to the rotation restricting portion 1312, only a portion of the rotation restricting portion which is disposed to the connecting portion 1311 may be exposed from the first outer covering 11. To be more specific, in this embodiment, upper surfaces of the plurality of protruding portions 1313 of the rotation restricting portions 1312 are exposed. A mound portion 117 having a circular shape as viewed in a top plan view is formed on an upper surface of the first outer covering 11 such that the mound portion 117 surrounds the whole periphery of the plurality of protruding portions 1313 of the rotation restricting portion 1312.

The conductive member 132 is disposed inside the first outer covering 11 with respect to the external connection terminal 131. The widened portion 1324 of the conductive member 132 is exposed to the outside from the first outer covering 11 through the first opening 81 formed in the first outer covering 11. That is, with respect to the conductive member 132, the portion of the conductive member 132 other than the widened portion 1324 is embedded in and sealed by the first outer covering 11. Mounting of the widened portion 1324 on the bus bar 41 and dismounting of the widened portion 1324 from the bus bar 41 can be performed through the first opening 81.

The fixing member 133 is configured such that the bolt head 1332 projecting from the conductive member 132 is embedded and is sealed in the first outer covering 11.

The portions of the positive electrode external terminal 13 except for the connecting portion 1311 and the widened portion 1324 are sealed by the first outer covering 11 and hence, a water intrusion path where water intrudes along the external connection terminal 131 and the conductive member 132 is shut down. The portions of the positive electrode external terminal 13 except for the connecting portion 1311 and the widened portion 1324 are sealed so that such portions are covered by the first outer covering 11 and hence, insulating property can be maintained with certainty.

As shown in FIG. 7 and FIG. 8, a portion of a lower surface of the first outer covering 11 which corresponds to the bolt head 1332 of the fixing member 133 forms a disk-like protrusion 118 projecting from other portions of the lower surface of the first outer covering 11. From a viewpoint of ensuring an inner space of the outer covering 10, it is preferable that a projecting amount of the protrusion 118 be set as small as possible. That is, it is preferable that the portion of the lower surface of the first outer covering 11 which corresponds to the positive electrode external terminal 13 has a flat surface as a whole. It is further preferable that a thickness of such a portion is reduced to an extent that at least one of waterproofness or insulating property is not deteriorated.

Next, a step of manufacturing the first outer covering 11 which is one of steps of a method of manufacturing an energy storage apparatus 1 is described.

First, the external connection terminal 131, a conductive member 132 and a fixing member 133 shown in FIG. 5 are assembled to each other. To be more specific, the fixing shaft 1331 of the fixing member 133 is inserted into the through hole 1323 formed in the conductive member 132 and is threadedly engaged with a threaded hole 1314 formed in the external connection terminal 131 so that the external connection terminal 131 and the conductive member 132 are fixed to each other. Accordingly, the positive electrode external terminal 13 shown in FIG. 6 is assembled. The negative electrode external terminal 14 is also assembled in accordance with the same steps.

The positive electrode external terminal 13 and the negative electrode external terminal 14 in an assembled state are molded by insert molding using a resin material for forming the first outer covering 11 thus forming the first outer covering 11. With such a step, the positive electrode external terminal 13 is integrally formed with the first outer covering 11 in a state where the connecting portion 1311 and the widened portion 1324 are exposed to the outside, and other portions of the positive electrode external terminal 13 are sealed by the first outer covering 11. The negative electrode external terminal 14 is also brought into the same state.

As has been described heretofore, according to the energy storage apparatus 1 of the embodiment of the present invention, the external connection terminal 131 and the conductive member 132 are sealed by the first outer covering 11 in a state where the external connection terminal 131 and the conductive member 132 are assembled to each other.

In this state, the connecting portion 1311 of the external connection terminal 131 is exposed from the first outer covering 11, and portions of the external connection terminal 131 other than the connecting portion 1311 are sealed by the first outer covering 11. With such a configuration, a water intrusion path where water intrudes along the external connection terminal 131 and the conductive member 132 can be closed and hence, insulating property can also be maintained with certainty.

In a state before the external connection terminal 131 and the conductive member 132 are sealed by the first outer covering 11, the external connection terminal 131 and the conductive member 132 are parts separated from each other and hence, the external connection terminal 131 and the conductive member 132 can be formed by selectively using materials appropriate for forming the external connection terminal 131 and the conductive member 132.

The external connection terminal 131 and the conductive member 132 are sealed by the first outer covering 11 in a state where the external connection terminal 131 and the conductive member 132 are assembled to each other and hence, it is possible to suppress loosening of assembling between the external connection terminal 131 and the conductive member 132. The external connection terminal 131 and the conductive member 132 are sealed by the first outer covering 11 and hence, it is possible to disperse a stress applied from the outside to the first outer covering 11. Accordingly, it is possible to increase torque resistance and drawing resistance.

A portion of the conductive member 132 connected to the energy storage device 100 (widened portion 1324) is exposed from the first outer covering 11 and hence, an operation of connecting the energy storage device 100 and the conductive member 132 to each other can be performed easily.

The fixing member 133 is sealed by the first outer covering 11 in a state where the fixing member 133 fixes the external connection terminal 131 and the conductive member 132 to each other and hence, the external connection terminal 131 and the conductive member 132 can be firmly assembled to each other by the fixing member 133. The fixing member 133 is sealed and hence, loosening of the fixing member 133 can be also suppressed.

An intermediate path of the conductive member 132 between the connection position (through hole 1325) and the assembling position (through hole 1323) has at least one of a bent shape, a curved shape, a folded shape and a combination thereof. Thus, the conductive member 132 can acquire an elongated shape compared to a case where the conductive member 132 extends in a linear shape between the connection position and the assembling position. Accordingly, a water intrusion path can be elongated and hence, even when water intrudes into the energy storage apparatus by any chance, it is possible to make it difficult for water to reach the inside of the first outer covering 11.

Further, the conductive member 132 has a shape longer than a shape which the conductive member 132 has a shape when the conductive member 132 extends in a linear shape between the connection position and the assembling position and hence, an area of the conductive member 132 sealed by the first outer covering 11 can be increased. Accordingly, a torque resistance at the time of performing an operation of connecting the connecting portion 1311 and the external equipment to each other can be increased.

Due to the formation of the raised portion 1328, the connection position is disposed higher than other portions, and the raised portion 1328 is sealed by the first outer covering 11. Accordingly, even when water intrudes into the energy storage apparatus by any chance, it is difficult for water to reach the connection position. It is sufficient that the raised portion 1328 is formed at any position between the connection position of the conductive member 132 and the assembling position of the conductive member 132.

The concave portions 1329 are formed on both side portions of the conductive member 132 and hence, the water intrusion path can be further elongated.

The water intrusion path can be elongated also by forming a convex portion on a peripheral edge portion of the conductive member 132. Both the concave portion and the convex portion may be formed on the peripheral edge portion of the conductive member 132. The number of concave portions or the convex portions is not particularly limited.

The fixing shaft 1331 of the fixing member 133 and the center axis C1 of the external connection terminal 131 are disposed to be aligned with each other and hence, the external connection terminal 131 can be stably fixed by one fixing member 133.

The conductive member 132 is integrally formed with the external connection terminal 131 and the fixing member 133 in a state where the conductive member 132 is sandwiched between the external connection terminal 131 and the fixing member 133 at a position inside of the first outer covering 11 with respect to the external connection terminal 131. Accordingly, even when a force for pushing the external connection terminal 131 or a force for pulling out the external connection terminal 131 is applied to the external connection terminal 131, it is possible to suppress the external connection terminal 131 from being removed from the conductive member 132.

Although the energy storage apparatus according to the embodiment of the present invention has been described heretofore, the present invention is not limited to the above-mentioned embodiment. That is, it should be construed that the embodiment disclosed in this specification is only for an exemplifying purpose in all aspects and is not limited thereto. The scope of the present invention is not designated by the above-mentioned description but is designated by Claims, and it is intended that all modifications which fall within the meaning and the scope equivalent to Claims are also included in the scope of the present invention.

For example, in the above-mentioned embodiment, the case is exemplified where the widened portion 1324 of the conductive member 132 is exposed from the first outer covering 11. However, the configuration may be adopted where the whole conductive member 132 is embedded and sealed by the first outer covering 11. In this case, it is necessary to ensure an electric connection between the conductive member 132 and the bus bar 41. As a method of realizing such an electrical connection, for example, there are several methods including a method where insert molding is applied also to a connecting portion between the conductive member 132 and the bus bar 41, a method where another conductive member connected to the conductive member 132 is exposed from the first outer covering 11 and the conductive member 132 is connected to the bus bar 41 through the exposed portion.

The description has been made by exemplifying the case where the projecting portion 1322 of the conductive member 132 is orthogonal to the longitudinal direction of the body portion 1321. However, it is sufficient that the projecting portion of the conductive member project in the direction which intersects with the longitudinal direction of the body portion 1321. As described previously, provided that the external connection terminal 131 is assembled to the projecting portion 1322 projecting in the direction which intersects with the longitudinal direction of the body portion 1321, an assembling position where the external connection terminal 131 is assembled to the projecting portion 1322 can be adjusted by adjusting a projecting amount of the projecting portion 1322.

The present invention is applicable to an energy storage device and an energy storage apparatus which include an outer covering.

What is claimed is:

1. An energy storage apparatus, comprising:
an energy storage device;
an outer covering;
an external connection terminal including a connecting portion to which an external equipment is connected; and
a conductive member assembled to the external connection terminal, and electrically connected to the energy storage device,
wherein the external connection terminal and the conductive member are assembled to each other, the conductive member being located inside the outer covering,
wherein the connecting portion of the external connection terminal is exposed from the outer covering, and
wherein a portion of the external connection terminal other than the connecting portion is located inside the outer covering.

2. The energy storage apparatus according to claim 1, wherein a portion of the conductive member connected to the energy storage device is exposed from the outer covering.

3. The energy storage apparatus according to claim 1, further comprising a fixing member which fixes the external connection terminal and the conductive member to each other,
wherein the fixing member is located inside the outer covering in a state where the fixing member fixes the external connection terminal and the conductive member to each other.

4. The energy storage apparatus according to claim 1, wherein an intermediate path of the conductive member between a connection position, where the conductive member is electrically connected to the energy storage device, and an assembling position, where the external connection terminal is assembled to the conductive member, has at least one of a bent shape, a curved shape, a folded shape, and a combination thereof.

5. The energy storage apparatus according to claim 4, wherein the conductive member includes a raised portion in which at least a part of the conductive member, which falls within a range from the connection position to the assembling position, is set higher than the assembling position, and a portion of the raised portion of the conductive member is located inside the outer covering.

6. The energy storage apparatus according to claim 1, wherein at least one of a concave portion or a convex portion is formed on a peripheral edge portion of the conductive member.

7. A method of manufacturing the energy storage apparatus described in claim 1, wherein the outer covering is formed by insert molding using a resin material in a state where the external connection terminals and the conductive members are assembled to each other.

8. The energy storage apparatus according to claim 1, wherein the external connection terminal comprises brass, aluminum, or an aluminum alloy, and the conductive member comprises copper or a copper alloy.

9. An energy storage apparatus, comprising:
an energy storage device;
an outer covering;
an external connection terminal including a connecting portion to which an external equipment is connected;
a conductive member assembled to the external connection terminal, and electrically connected to the energy storage device; and
a fixing member which fixes the external connection terminal and the conductive member to each other,
wherein the external connection terminal and the conductive member are assembled to each other, the conductive member being located inside the outer covering,
wherein the connecting portion of the external connection terminal is exposed from the outer covering,
wherein a portion of the external connection terminal other than the connecting portion is located inside the outer covering,
wherein a portion of the conductive member connected to the energy storage device is exposed from the outer covering,
wherein the fixing member is located inside the outer covering in a state where the fixing member fixes the external connection terminal and the conductive member to each other,
wherein an intermediate path of the conductive member between a connection position where the conductive member is electrically connected to the energy storage device and an assembling position where the external connection terminal is assembled to the conductive member has at least one of a bent shape, a curved shape, a folded shape, and a combination thereof,
wherein the conductive member includes a raised portion in which at least a part of the conductive member, which falls within a range from the connection position to the assembling position, is set higher than the assembling position, and a portion of the raised portion of the conductive member is located inside the outer covering, and
wherein at least one of a concave portion or a convex portion is formed on a peripheral edge portion of the conductive member.

10. An energy storage apparatus, comprising:
a plurality of energy storage devices, each of the plurality of energy storage devices including an electrode assembly and a container which houses the electrode assembly;
an outer covering housing the plurality of energy storage devices;
an external connection terminal including a connecting portion to which an external equipment is connectable; and
a conductive member assembled to the external connection terminal, and electrically connected to the plurality of energy storage devices,
wherein the external connection terminal and the conductive member are located inside the outer covering,
wherein the connecting portion of the external connection terminal is exposed from the outer covering, and
wherein a portion of the external connection terminal other than the connecting portion is embedded in the outer covering.

11. The energy storage apparatus according to claim 1, wherein an upper surface of the external connection terminal is flush with an upper surface of the outer covering.

12. The energy storage apparatus according to claim 11, wherein the upper surface of the external connection terminal and the upper surface of the outer covering are exposed.

13. The energy storage apparatus according to claim 1, wherein the outer cover is disposed on a bottom surface of the conductive member and on an upper surface of the conductive member.

14. The energy storage apparatus according to claim 1, wherein the outer cover is in a direct contact with an upper surface of the conductive member.

15. The energy storage apparatus according to claim 1, wherein the external connection terminal comprises a protruding portion which is disposed along a circumferential direction of the external connection terminal, and a portion of the protruding portion is exposed from the outer covering.

16. The energy storage apparatus according to claim 3, wherein the fixing member fastens the external connection terminal and the conductive member to each other by caulking.

17. The energy storage apparatus according to claim 9, wherein the fixing member fastens the external connection terminal and the conductive member to each other by caulking.

18. The energy storage apparatus according to claim 9, wherein the external connection terminal comprises a protruding portion which is disposed along a circumferential direction of the external connection terminal, and a portion of the protruding portion is exposed from the outer covering.

19. The energy storage apparatus according to claim 10, wherein the external connection terminal comprises a protruding portion which is disposed along a circumferential direction of the external connection terminal, and a portion of the protruding portion is exposed from the outer covering.

* * * * *